(12) United States Patent
Kim et al.

(10) Patent No.: US 10,115,943 B2
(45) Date of Patent: Oct. 30, 2018

(54) BATTERY PACKING MODULE AND BATTERY PACK

(71) Applicant: KOREA INSTITUTE OF ENERGY RESEARCH, Daejeon (KR)

(72) Inventors: Gang Chul Kim, Daejeon (KR); Young Dug Pyo, Daejeon (KR); Chong Pyo Cho, Daejeon (KR); Young Min Woo, Daejeon (KR); Jin Young Jang, Daejeon (KR); Yong Jin Jung, Daejeon (KR); Hae Kwang Kim, Gunsan (KR); Oh Seuk Kwon, Sejong (KR); Chang Soo Jin, Daejeon (KR)

(73) Assignee: Korea Institute Of Energy Research (KR)

( * ) Notice: Subject to any disclaimer, the term of this patent is extended or adjusted under 35 U.S.C. 154(b) by 134 days.

(21) Appl. No.: 15/222,346

(22) Filed: Jul. 28, 2016

(65) Prior Publication Data
US 2017/0125755 A1    May 4, 2017

(30) Foreign Application Priority Data

Nov. 2, 2015  (KR) .................. 10-2015-0153043
Jul. 15, 2016  (KR) .................. 10-2016-0090256

(51) Int. Cl.
*H01M 2/10* (2006.01)
*H01M 2/20* (2006.01)
(Continued)

(52) U.S. Cl.
CPC ......... *H01M 2/1077* (2013.01); *H01M 2/206* (2013.01); *H01M 10/625* (2015.04);
(Continued)

(58) Field of Classification Search
CPC .. H01M 2/1077; H01M 2/206; H01M 10/625; H01M 10/643; H01M 10/6551;
(Continued)

(56) References Cited

U.S. PATENT DOCUMENTS 6,191,941 B1 *  2/2001  Ito ..................... G06F 1/1616
                                                          312/223.1
2003/0013009 A1 *  1/2003  Dansui ................ H01M 2/105
                                                           429/120
(Continued)

FOREIGN PATENT DOCUMENTS

JP       2006-253060 A     9/2006
JP       2014053275 A *    3/2014  ............ B60L 1/003
(Continued)

*Primary Examiner* — Gregg Cantelmo
(74) *Attorney, Agent, or Firm* — Harness, Dickey & Pierce, P.L.C.

(57) ABSTRACT

The present invention provides a battery packing module that includes: a heat dissipation member having a plurality of insertion cylinders arranged in a lattice type and a through-hole formed between the insertion cylinders in a direction that is parallel to the longitudinal direction of the insertion cylinders, wherein the outer circumferential surfaces of adjacent insertion cylinders are connected to each other; a plurality of cylindrical battery cells inserted into the insertion cylinders and configured to make contact with the inner circumferential surfaces of the insertion cylinders; and packing plates coupled to the upper ends and lower ends of the battery cells, wherein the packing plates have a current flow hole formed therein through which electrodes of the battery cells are exposed and battery mounting recesses formed therein in which the battery cells are mounted.

19 Claims, 15 Drawing Sheets

(51) Int. Cl.
*H01M 10/643* (2014.01)
*H01M 10/6569* (2014.01)
*H01M 10/6563* (2014.01)
*H01M 10/625* (2014.01)
*H01M 10/6551* (2014.01)

(52) U.S. Cl.
CPC ..... *H01M 10/643* (2015.04); *H01M 10/6551* (2015.04); *H01M 10/6563* (2015.04); *H01M 10/6569* (2015.04); *H01M 2220/20* (2013.01)

(58) Field of Classification Search
CPC ......... H01M 10/6563; H01M 10/6569; H01M 2220/20
See application file for complete search history.

(56) References Cited

U.S. PATENT DOCUMENTS

| | | | | |
|---|---|---|---|---|
| 2009/0233163 | A1* | 9/2009 | Fang | H01M 2/1022 429/99 |
| 2010/0047676 | A1* | 2/2010 | Park | H01M 2/105 429/93 |
| 2010/0310919 | A1* | 12/2010 | Villarreal | H01M 2/1077 429/120 |
| 2011/0177373 | A1* | 7/2011 | Pellenc | H01M 2/105 429/120 |
| 2011/0293986 | A1* | 12/2011 | Kozu | H01M 2/105 429/120 |
| 2012/0013340 | A1* | 1/2012 | Yuasa | H01M 2/206 324/430 |

FOREIGN PATENT DOCUMENTS

| | | | | |
|---|---|---|---|---|
| JP | 5704098 | B2 | 4/2015 | |
| KR | 100886571 | B1 | 3/2009 | |
| KR | 2011-0062988 | A | 6/2011 | |
| KR | 2011-0084959 | A | 7/2011 | |
| KR | 20-2013-0003390 | U | 6/2013 | |
| KR | 1020140034413 | A | 3/2014 | |
| KR | 101520902 | B1 | 5/2015 | |
| KR | 2015-0121987 | A | 10/2015 | |
| WO | WO-2012013641 | A1* | 2/2012 | ............ H01M 2/105 |
| WO | WO-2014119286 | A1* | 8/2014 | .............. H01M 2/34 |

\* cited by examiner

PRIOR ART

BATTERY PACKING MODULE AND BATTERY PACK

CROSS-REFERENCE TO RELATED APPLICATIONS

This application claims priority from Korean Patent Application No. 10-2015-0153043, filed on Nov. 2, 2015 and 10-2016-0090256 filed on Jul. 15, 2015 which are hereby incorporated by reference for all purposes as if fully set forth herein.

BACKGROUND

1. Field of the Invention

The present invention relates to a battery packing module and a battery pack.

2. Description of the Prior Art

In recent years, various types of means of transportation using electricity, which is clean energy, have been developed through the convergence and innovation of high technologies. In particular, micro mobility electric vehicle technology has been actively developed on account of a limitation in parking spaces, traffic congestion, and the like, which are caused by the concentration of the population of cities.

The spread of micro mobility electric vehicles is expected to be consistently increased due to the convenience and efficiency as a means for commuting and for short-distance moving in urban areas.

A necessity for developing a battery pack has increased with an increase in demands for micro mobility electric vehicles, but the development of a battery pack is still at a level of simply packaging battery cells by combining them as illustrated in FIG. 1.

FIG. 1 is an exploded perspective view of a battery pack in the related art.

As illustrated in FIG. 1, the battery pack in the related art includes: current collectors 128 connected to positive and negative electrodes of battery cells 112; a housing 102 that accommodates the battery cells 112 and the current collectors 128 therein; and a top part 104 and a base part 133 that are coupled to opposite ends of the housing 102 so as to be connected with external terminals.

However, since the battery pack in the related art has a structure in which the plurality of battery cells are simply packaged in the housing, there is a problem in that the battery pack has to be separately manufactured according to a required battery capacity, the process increases, and the manufacturing cost increases.

In particular, various types of components (such as the housing, the current collectors, and the like) that are included in the battery pack have to be differently manufactured according to the number of battery cells. Further, in the related art, the size and volume of the battery pack are increased than necessary even when battery cells are connected in order to increase the battery capacity, so it may be impossible to mount the battery pack in a micro mobility electric vehicle.

In addition, due to the nature of the output of the battery that is sensitive to temperature when being used and stored, the duration time of the battery may decrease and the lifetime thereof may be reduced due to heat generated from the battery cells when the battery pack is used.

SUMMARY

In this background, an aspect of the present invention is to provide a battery packing technology that is capable of facilitating the expansion of a battery pack according to a required battery capacity and minimizing the volume and weight of the whole battery pack.

Another aspect of the present invention is to provide a battery packing technology by which a battery pack is integrally provided with a structure for cooling heat that is generated from battery cells when the battery pack is used, thereby maintaining the output of the battery at a constant level and extending the lifetime of the battery.

Further, the aspect of the present invention is not limited thereto, and other unmentioned aspects of the present invention may be clearly appreciated by those skilled in the art from the following descriptions.

To this end, in accordance with an aspect of the present invention, there is provided a battery packing module that includes: a heat dissipation member having a plurality of insertion cylinders arranged in a lattice type and a through-hole formed between the insertion cylinders in a direction that is parallel to the longitudinal direction of the insertion cylinders, wherein the outer circumferential surfaces of adjacent insertion cylinders are connected to each other; a plurality of cylindrical battery cells inserted into the insertion cylinders and configured to make contact with the inner circumferential surfaces of the insertion cylinders; and packing plates coupled to the upper ends and lower ends of the battery cells, wherein the packing plates have a current flow hole formed therein through which electrodes of the battery cells are exposed and battery mounting recesses formed therein in which the battery cells are mounted.

In accordance with another aspect of the present invention, there is provided a battery packing module that includes: a plurality of cylindrical battery cells, wherein four battery cells are arranged in a lattice type at the outer periphery, and one battery cell is disposed between the four battery cells; a heat dissipation member having a plurality of insertion cylinders into which the battery cells are inserted, respectively, and a through-hole formed between the insertion cylinders, which are disposed at the outer periphery, in a direction that is parallel to the longitudinal direction of the insertion cylinders; and packing plates coupled to the upper ends and lower ends of the battery cells, wherein the packing plates have a current flow hole formed therein through which electrodes of the battery cells are exposed and battery mounting recesses formed therein in which the battery cells are mounted.

In accordance with yet another aspect of the present invention, there is provided a battery pack that includes: a plurality of battery packing modules; and a cooling/heating device coupled to sides of the plurality of battery packing modules and having a blower fan and a heater therein, wherein each of the battery packing modules includes: a heat dissipation member having a plurality of insertion cylinders arranged in a lattice type and a through-hole formed between the insertion cylinders in a direction that is parallel to the longitudinal direction of the insertion cylinders, wherein the outer circumferential surfaces of adjacent insertion cylinders are connected to each other; a plurality of cylindrical battery cells inserted into the insertion cylinders and configured to make contact with the inner circumferential surfaces of the insertion cylinders; and packing plates coupled to the upper ends and lower ends of the battery cells, wherein the packing plates have a current flow hole formed therein through which electrodes of the battery cells are exposed and battery mounting recesses formed therein in which the battery cells are mounted.

According to the embodiments of the present invention, it is possible to facilitate the expansion of a battery pack according to a required battery capacity and to minimize the volume and weight of the whole battery pack.

In addition, according to the embodiments of the present invention, a battery pack is integrally provided with a structure for cooling heat that is generated from battery cells when the battery pack is used, thereby maintaining the output of the battery at a constant level and extending the lifetime of the battery.

BRIEF DESCRIPTION OF THE DRAWINGS

The above and other objects, features, and advantages of the present invention will be more apparent from the following detailed description taken in conjunction with the accompanying drawings, in which.

DETAILED DESCRIPTION

Figure 1:
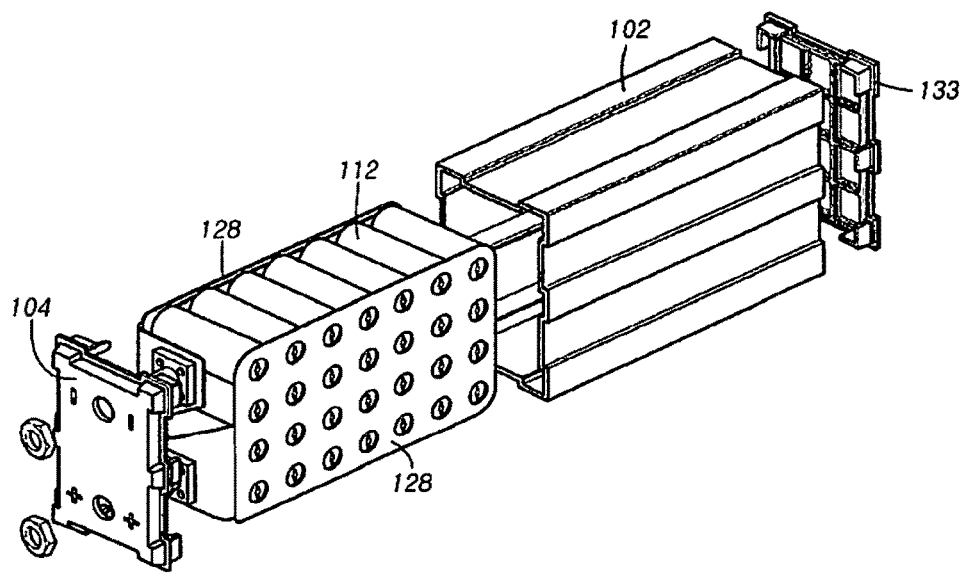
FIG. 1 is an exploded perspective view of a battery pack in the related art.

Hereinafter, embodiments of the present invention will be described in detail with reference to the accompanying drawings. In adding reference numerals to elements in each drawing, the same elements will be designated by the same reference numerals, if possible, although they are shown in different drawings. Further, in the following description of the present invention, a detailed description of known functions and configurations incorporated herein will be omitted when it is determined that the description may make the subject matter of the present invention rather unclear.

In addition, terms, such as first, second, A, B, (a), (b) or the like may be used herein when describing components of the present invention. These terms are merely used to distinguish one structural element from other structural elements, and a property, an order, a sequence and the like of a corresponding structural element are not limited by the term. It should be noted that if it is described in the specification that one component is "connected," "coupled" or "joined" to another component, a third component may be "connected," "coupled," and "joined" between the first and second components, although the first component may be directly connected, coupled or joined to the second component.

Figure 2:
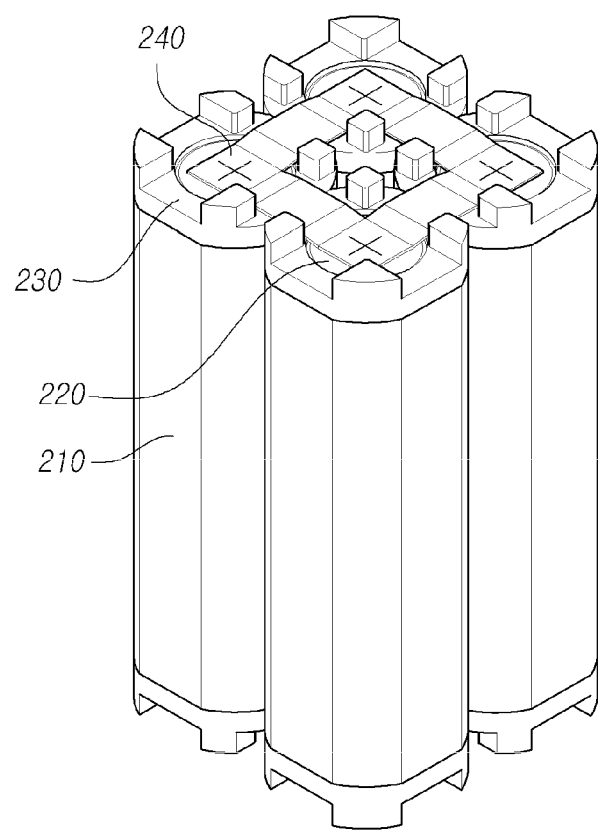
FIG. 2 is a perspective view of a battery packing module according to one embodiment.
Figure 3:
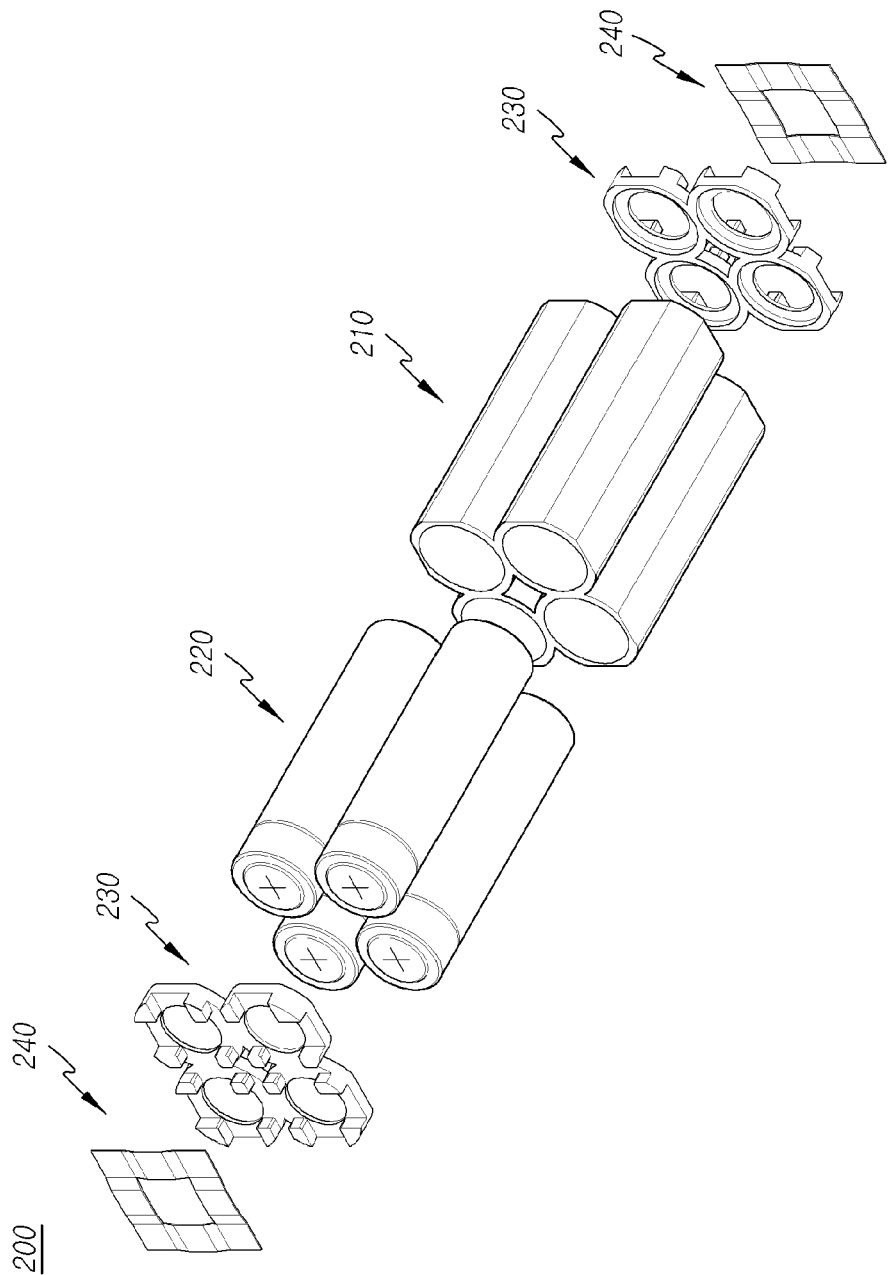
FIG. 3 is an exploded perspective view of the battery packing module according to the embodiment illustrated in FIG. 2.

FIG. 2 is a perspective view of a battery packing module according to one embodiment, and FIG. 3 is an exploded perspective view of the battery packing module according to the embodiment illustrated in FIG. 2.

Referring to FIGS. 2 and 3, the battery packing module 200 may include a heat dissipation member 210, battery cells 220, packing plates 230, and connecting bars 240.

The plurality of cylindrical battery cells 220 are inserted into the heat dissipation member 210, and the packing plates 230 are coupled to the upper ends and lower ends of the battery cells 220. The electrodes of the battery cells 220, which are exposed through current flow holes of the packing plates 230, are connected by the connecting bars 240 so that a single battery packing module is formed.

The battery cells 220 may be longer than the heat dissipation member 210. In this embodiment, a part of each battery cell 220 inserted into the heat dissipation member 210 protrudes outward from the heat dissipation member 210. Specifically, a part of the upper end and a part of the lower end of the battery cell 220 may protrude outward from the heat dissipation member 210, and the packing plates 230 may be coupled to the protrusions.

The packing plates 230 and the heat dissipation member 210 may be coupled to each other by an adhesive member, such as an adhesive, etc., or may simply contact each other with no adhesive member.

The connecting bars 240 may mutually connect the electrodes on the upper and lower ends of the battery cells 220, and the coupling force between the elements of the battery packing module 200 may be generated by the connecting bars 240.

The connecting bars 240 may be formed of a conductive metal or alloy. By way of specific example, the connecting bars 240 may be formed of nickel or a nickel alloy. The connecting bars 240 may be coupled with the electrodes of the battery cells 220 by welding.

Figure 4:
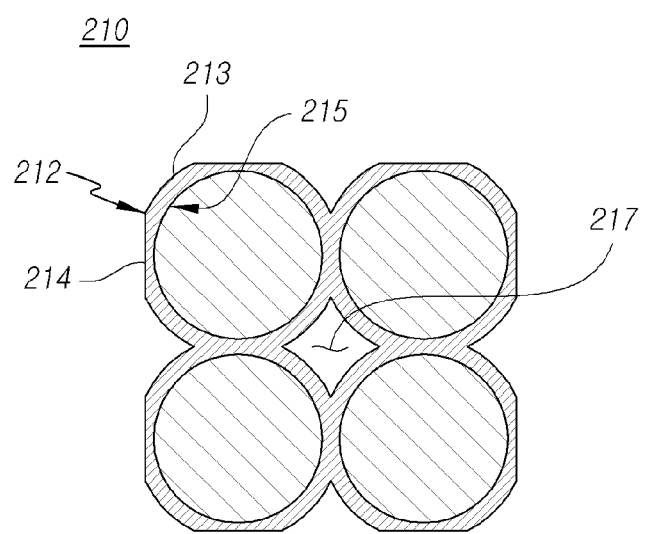
FIG. 4 is a top plan view of a heat dissipation member according to one embodiment.

FIG. 4 is a top plan view of the heat dissipation member according to one embodiment.

Referring to FIG. 4, the heat dissipation member 210 may include a plurality of insertion cylinders 212. The battery cells 220 are inserted into the respective insertion cylinders 212.

The inner circumferential surfaces 215 of the insertion cylinders 212 may make contact with the outer circumferential surfaces of the battery cells 220. The insertion cylinders 212 may have the inner circumferential surfaces 215 that have the same shape as the outer circumferential surfaces of the battery cells 220 so as to be closely coupled with the battery cells 220. In a case where the battery cells 220 are formed in a cylindrical shape as in the embodiment illustrated in FIG. 4, the inner circumferential surfaces 215 of the insertion cylinders 212 may also be formed in a cylindrical shape.

The heat generated from the battery cells 220 may be radiated to the outside through contact between the battery cells 220 and the inner circumferential surfaces 215 of the insertion cylinders 212. In contrast, the heat generated outside the insertion cylinders 212 may be transferred to the battery cells 220 through the contact.

The battery cells 220 exhibit maximum efficiency at a proper temperature. For example, the battery cells 220 may exhibit the maximum efficiency at a temperature ranging from 20 to 40 degrees Celsius. When the battery cells 220 start charging/discharging, heat is generated therein so that the internal temperature of the battery cells 220 rises, and the heat may be radiated to the outside through the insertion cylinders 212. In contrast, in a case of a low temperature as in the winter, the temperature of the battery cells 220 may be low, but the heat generated by a heater may be transferred to the battery cells 220 through the insertion cylinders 212 in order to maintain the battery cells 220 at a proper temperature.

The insertion cylinders 212 may be formed of a highly thermally conductive material. Metal materials may generally have a high thermal conductivity. The insertion cylinders 212 may be formed of, for example, magnesium or a magnesium alloy.

Magnesium or a magnesium alloy has a high thermal conductivity and may be easily formed by extruding. The heat dissipation member 210 that includes the insertion cylinders 212 formed of magnesium or a magnesium alloy may be formed by extruding.

The heat dissipation member 210, according to the embodiment illustrated in FIG. 4, includes four insertion cylinders 212. The four insertion cylinders 212 may be integrally formed through extruding, and the outer circumferential surface of each insertion cylinder 212 may be connected with the outer circumferential surfaces of adjacent insertion cylinders.

The heat dissipation member 210 may include the four insertion cylinders 212. In this configuration, the four insertion cylinders 212 may be arranged in a lattice type. When the four insertion cylinders 212 are arranged in a lattice type, a through-hole 217 may be formed between the four insertion cylinders 212. The through-hole 217 is formed in a direction that is parallel to the longitudinal direction of the insertion cylinders 212.

The through-hole 217 may function as an air vent. The insertion cylinders 212 may be air-cooled by air that circulates through the through-hole 217.

Each of the insertion cylinders 212 may have a curved surface 213 and flat surfaces 214 formed on the outer circumferential surface thereof.

The curved surface 213 form an external through-hole when the battery packing module is coupled with another battery packing module. The flat surfaces 214 make contact with flat surfaces of the other battery packing module.

Figure 5:
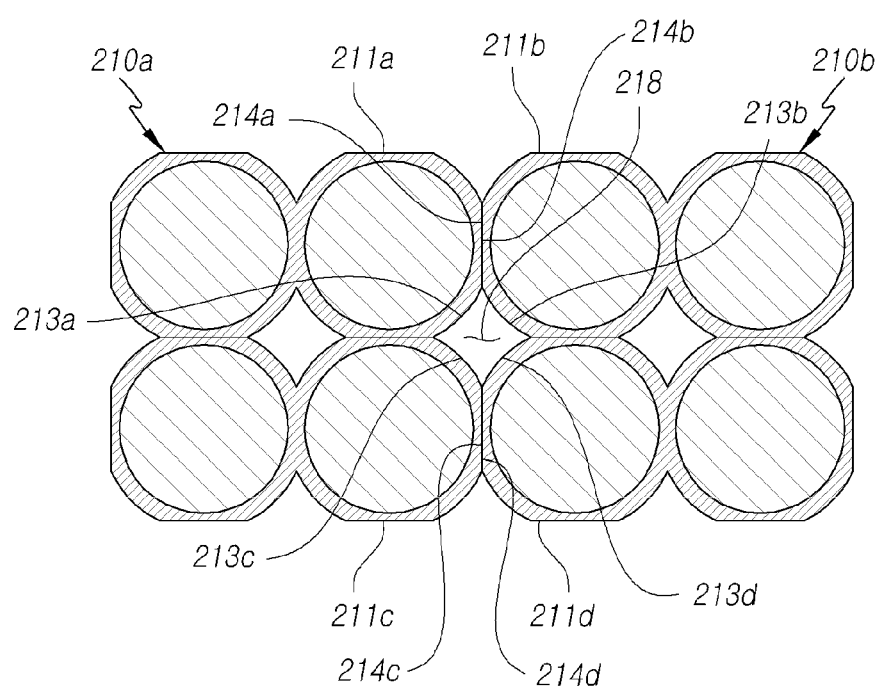
FIG. 5 is a view illustrating a structure in which a plurality of heat dissipation members are coupled to each other, according to one embodiment.

FIG. 5 is a view illustrating a structure in which a plurality of heat dissipation members are coupled to each other, according to one embodiment.

Referring to FIG. 5, heat dissipation members that belong to different battery packing modules may be coupled to each other.

The heat dissipation members 210a and 210b may be coupled to each other by flat surfaces that are formed on the outer circumferential surfaces of insertion cylinders.

Referring to FIG. 5, two flat surfaces 214a and 214c of the first heat dissipation member 210a may make surface-to-surface contact with two flat surfaces 214b and 214d of the second heat dissipation member 210b. As the flat surfaces have a larger area, heat may be exchanged better between the first and second heat dissipation members 210a and 210b.

The heat dissipation members 210a and 210b may form an external through-hole 218 by curved surfaces that are formed on the outer circumferential surfaces of the insertion cylinders.

Referring to FIG. 5, two curved surfaces 213a and 213c of the first heat dissipation member 210a may form the external through-hole 218 together with two curved surfaces 213b and 213d of the second heat dissipation member 210b. The heat dissipation members 210a and 210b may be air-cooled by air that circulates through the external through-hole 218.

Insertion cylinders 211a and 211b that constitute the respective heat dissipation members 210a and 210b may include two flat surfaces, and the heat dissipation members 210a and 210b may be coupled with other heat dissipation members located on the upper or lower side thereof, or on the left or right side thereof, while making surface-to-surface contact with the other heat dissipation members. The insertion cylinders 211a and 211b may include two curved surfaces and may form an external through-hole together with the other heat dissipation members.

Figure 6:
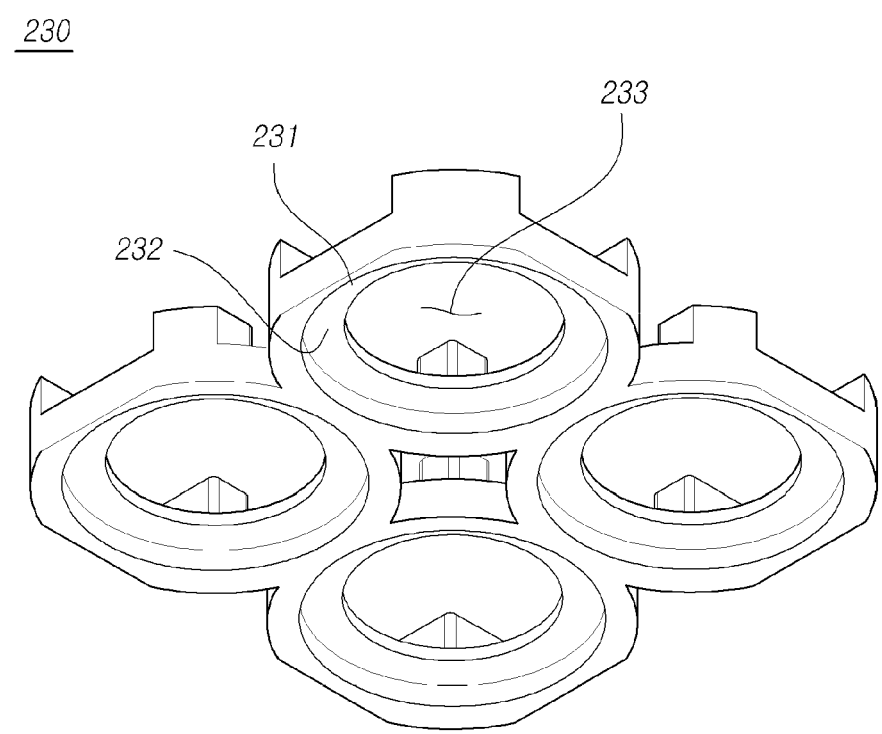
FIG. 6 is a bottom perspective view of a packing plate according to one embodiment.
Figure 7:
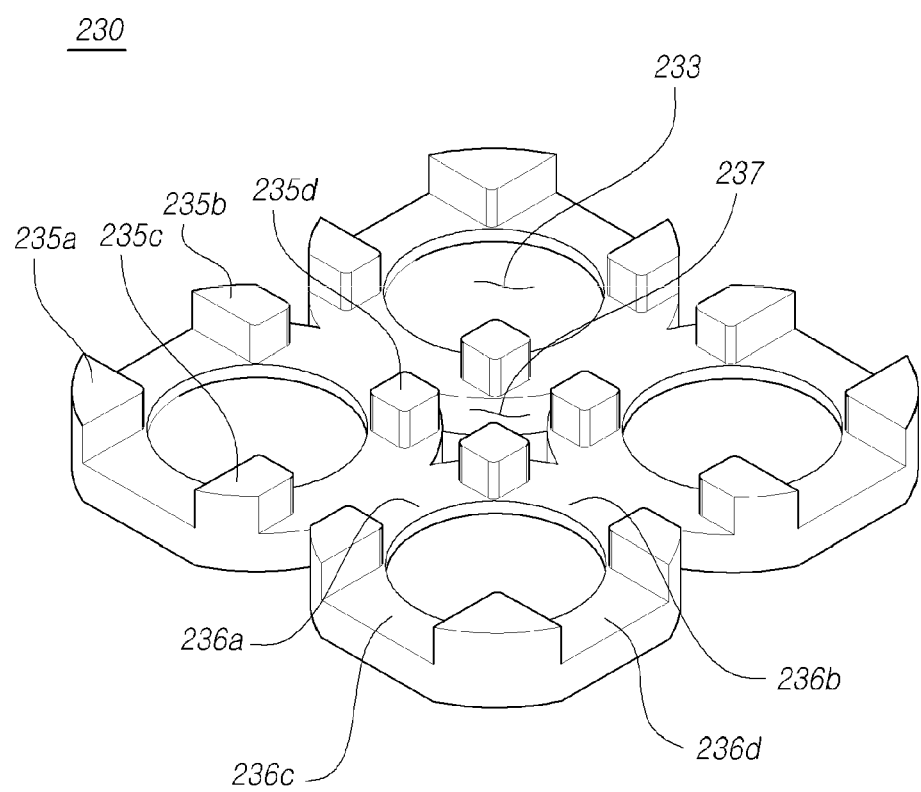
FIG. 7 is a top perspective view of the packing plate according to the embodiment illustrated in FIG. 6.

FIG. 6 is a bottom perspective view of the packing plate according to one embodiment, and FIG. 7 is a top perspective view of the packing plate according to the embodiment illustrated in FIG. 6.

The packing plates 230 are coupled to the upper and lower ends of the battery cells.

Referring to FIG. 6, the packing plate 230 may have battery mounting recesses 232 formed therein, and the battery cells may be mounted in the battery mounting recesses 232. The size of the cross-section of the battery mounting recesses 232 may be substantially the same as that of the battery cells, or may be larger than that of the battery cells by a coupling margin.

The packing plate 230 may have current flow holes 233 formed therein. When the battery cells are coupled to the packing plate 230, the electrodes of the battery cells may be exposed to the outside through the current flow holes 233. The electrodes of the battery cells, which are exposed to the outside, may be coupled with the connecting bar.

The shape of the outer circumferential surface 231 of the packing plate 230 may be substantially the same as that of the heat dissipation member. Accordingly, the packing plate 230 and the heat dissipation member may be coupled to each other with the same area.

Referring to FIG. 7, a plurality of protrusions 235a, 235b, 235c, and 235d may be formed on the top of the packing plate 230 so as to be located around the current flow hole 233. The protrusions 235a, 235b, 235c, and 235d may be formed on the four corners around the current flow hole 233 so as to be spaced apart from each other.

Connecting-bar mounting recesses 236a, 236b, 236c, and 236d, where the connecting bar may be disposed, may be formed between the protrusions 235a, 235b, 235c, and 235d. The connecting bar may be disposed in the connecting-bar mounting recesses 236a, 236b, 236c, and 236d.

The connecting-bar mounting recesses 236a, 236b, 236c, and 236d may be formed between two current flow holes 233, and the connecting bar may connect the electrodes of the battery cells, which are exposed through the two current flow holes 233, by way of the connecting-bar mounting recesses 236a, 236b, 236c, and 236d.

The portion 237 of the packing plate 230, which corresponds to the through-hole of the heat dissipation hole, may be open. In this embodiment, the through-hole of the heat dissipation member functions as an air vent.

The portion 237 of the packing plate 230, which corresponds to the through-hole of the heat dissipation member, may be blocked. In this embodiment, a phase change material (PCM) may be inserted into the through-hole. The phase change material (PCM) is a material that absorbs or radiates heat while the phase thereof is being changed, and may perform a function of maintaining an ambient temperature in a specified range.

In winter, heat may be stored in the phase change material (PCM) by an external power source when a battery is recharged, and the heat may prevent the temperature of the battery cells from falling down below zero while a micro mobility electric vehicle drives. In contrast, the phase change material (PCM) may also perform a function of absorbing the heat radiated from the battery cells.

Figure 8:
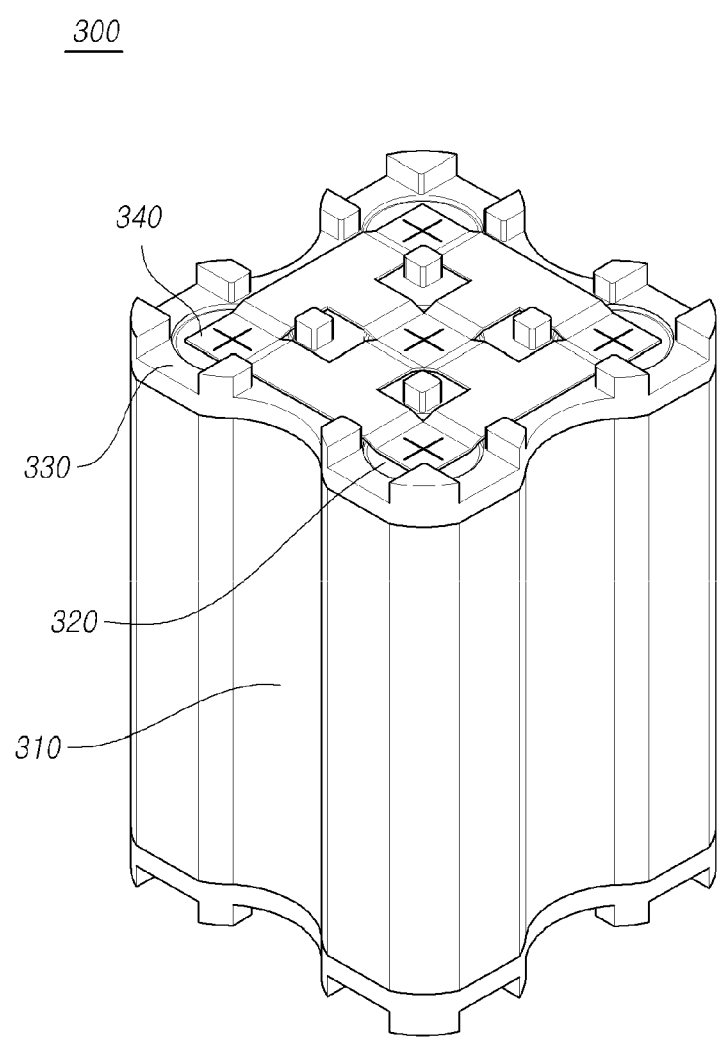
FIG. 8 is a perspective view of a battery packing module according to another embodiment.
Figure 9:
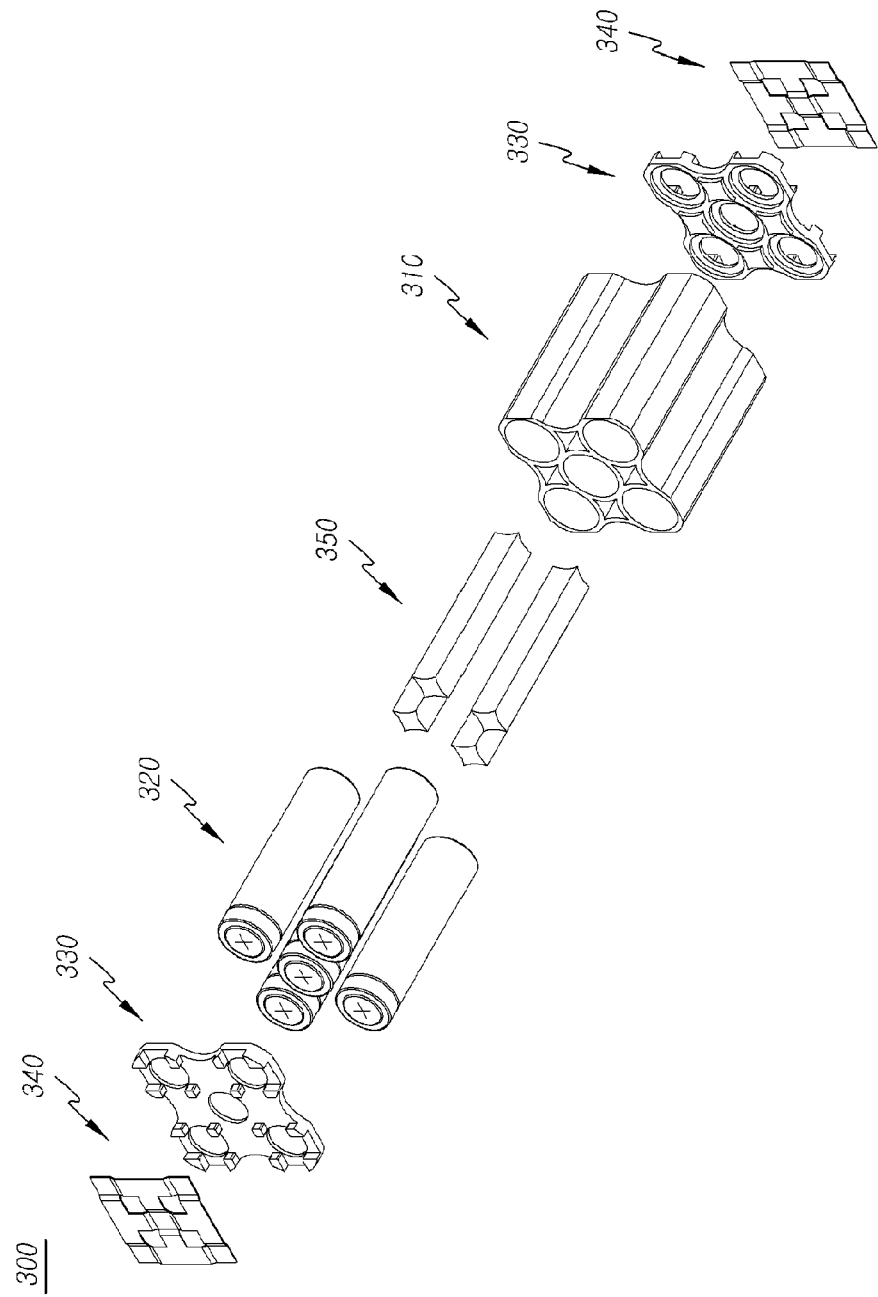
FIG. 9 is an exploded perspective view of the battery packing module according to the embodiment illustrated in FIG. 8.

FIG. 8 is a perspective view of a battery packing module according to another embodiment, and FIG. 9 is an exploded perspective view of the battery packing module according to the embodiment illustrated in FIG. 8.

Referring to FIGS. 8 and 9, the battery packing module 300 may include a heat dissipation member 310, battery cells 320, packing plates 330, connecting bars 340, and phase change materials 350.

The plurality of cylindrical battery cells 320 are inserted into the heat dissipation member 310, and the packing plates 330 are coupled to the upper and lower ends of the battery cells 320. The electrodes of the battery cells 320, which are exposed through current flow holes of the packing plates 330, are connected by the connecting bars 340 so that a single battery packing module is formed.

The battery cells 320 may be longer than the heat dissipation member 310. In this embodiment, a part of each battery cell 320 inserted into the heat dissipation member 310 protrudes outward from the heat dissipation member 310. Specifically, a part of the upper end and a part of the lower end of the battery cell 320 may protrude outward from the heat dissipation member 310, and the packing plates 330 may be coupled to the protrusions.

The packing plates 330 and the heat dissipation member 310 may be coupled to each other by an adhesive member, such as an adhesive, etc., or may simply contact each other with no adhesive member.

The connecting bars 340 may mutually connect the electrodes on the upper and lower ends of the battery cells 320, and the coupling force between the elements of the battery packing module 300 may be generated by the connecting bars 340.

The connecting bars 340 may be formed of a conductive metal or alloy. By way of specific example, the connecting bars 340 may be formed of nickel or a nickel alloy. The connecting bars 340 may be coupled with the electrodes of the battery cells 320 by welding.

The phase change materials 350 may be inserted into the heat dissipation member 310 to absorb the heat of the battery cells 320 or to transfer, to the battery cells 320, heat introduced from the outside.

Figure 10:
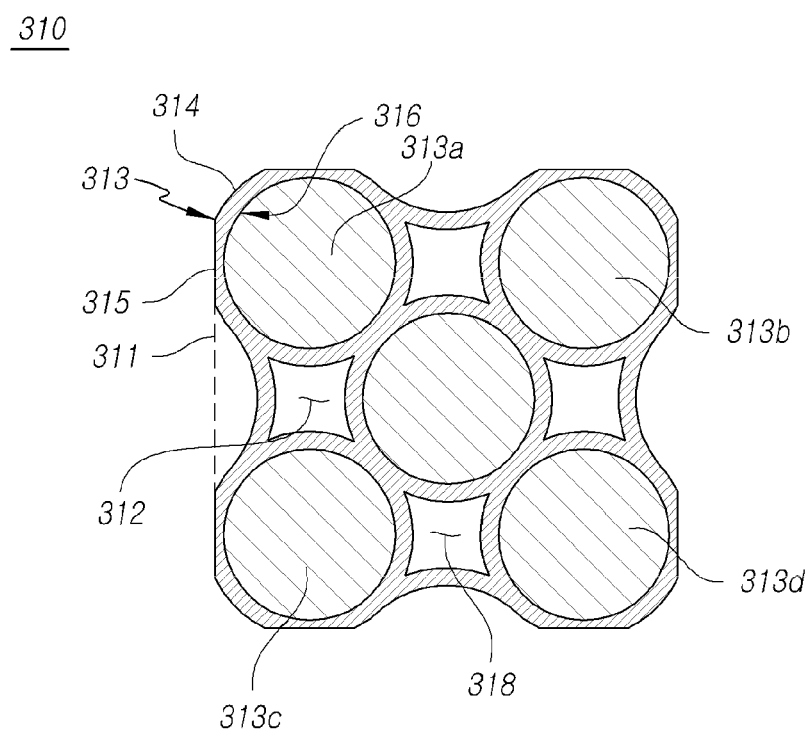
FIG. 10 is a top plan view of a heat dissipation member according to another embodiment.

FIG. 10 is a top plan view of the heat dissipation member according to another embodiment.

Referring to FIG. 10, the heat dissipation member 310 may include a plurality of insertion cylinders 313. The battery cells 320 are inserted into the respective insertion cylinders 313.

The inner circumferential surfaces 316 of the insertion cylinders 313 may make contact with the outer circumferential surfaces of the battery cells 320. The insertion cylinders 313 may have the inner circumferential surfaces 316 that have the same shape as the outer circumferential surfaces of the battery cells 320 so as to be closely coupled with the battery cells 320. In a case where the battery cells 320 are formed in a cylindrical shape as in the embodiment illustrated in FIG. 10, the inner circumferential surfaces 316 of the insertion cylinders 313 may also be formed in a cylindrical shape.

The heat generated from the battery cells 320 may be radiated to the outside through the contact between the battery cells 320 and the inner circumferential surfaces 316 of the insertion cylinders 313. In contrast, the heat generated outside the insertion cylinders 313 may be transferred to the battery cells 320 through the contact.

The insertion cylinders 313 may be formed of a highly thermally conductive material. Metal materials may generally have a high thermal conductivity. The insertion cylinders 313 may be formed of, for example, magnesium or a magnesium alloy.

Magnesium or a magnesium alloy has a high thermal conductivity and may be easily formed by extruding. The heat dissipation member 310 that includes the insertion cylinders 313 formed of magnesium or a magnesium alloy may be formed by extruding.

The heat dissipation member 310, according to the embodiment illustrated in FIG. 10, includes five insertion cylinders 313. The five insertion cylinders 313 may be integrally formed through extruding, and the outer circumferential surface of each insertion cylinder 313 may be connected with the outer circumferential surfaces of adjacent insertion cylinders.

The heat dissipation member 310 may include the five insertion cylinders 313. In this configuration, four insertion cylinders 313a, 313b, 313c, and 313d may be arranged in a lattice type at the outer periphery of the heat dissipation member 310, and one insertion cylinder 313e may be disposed in the middle of the heat dissipation member 310.

Each of the insertion cylinders 313a, 313b, 313c, and 313d, which are disposed at the outer periphery of the heat dissipation member 310, may have a curved surface 314 and a flat surface 315 that are formed on the outer circumferential surface thereof. Two flat surfaces 315 may be formed on each of the insertion cylinders 313a, 313b, 313c, and 313d, which are disposed at the outer periphery of the heat dissipation member 310, and may make contact with flat surfaces of other battery packing modules.

Through-holes 312 may be formed between the insertion cylinders 313a, 313b, 313c, and 313d, which are disposed at the outer periphery of the heat dissipation member 310, in a direction that is parallel to the longitudinal direction of the insertion cylinders.

The through-holes 312 may be located inside virtual planes 311 that extend from the flat surfaces 315. When the battery packing module is coupled with the other battery packing modules, the virtual planes thereof make contact with each other, and air vents are additionally formed near the through-holes 312 because the through-holes 312 are located inside the virtual planes.

Figure 11:
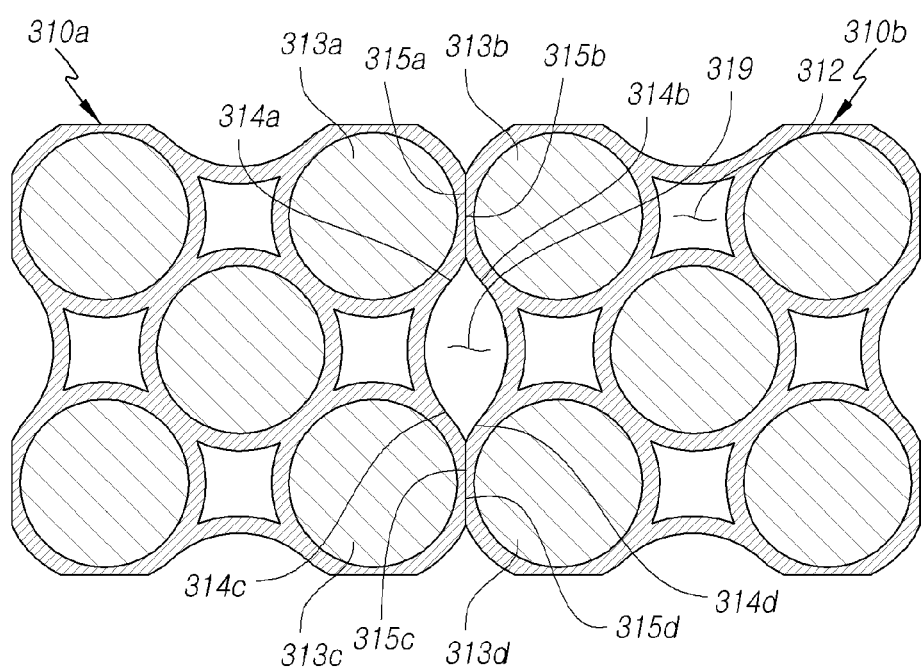
FIG. 11 is a view illustrating a structure in which a plurality of heat dissipation members are coupled to each other, according to another embodiment.

FIG. 11 is a view illustrating a structure in which a plurality of heat dissipation members are coupled to each other, according to another embodiment.

Referring to FIG. 11, heat dissipation members that belong to different battery packing modules may be coupled to each other.

The heat dissipation members 310a and 310b may be coupled to each other by flat surfaces that are formed on the outer circumferential surfaces of insertion cylinders.

Referring to FIG. 11, two flat surfaces 315a and 315c of the first heat dissipation member 310a may make surfaceto-surface contact with two flat surfaces 315*b* and 315*d* of the second heat dissipation member 310*b*. As the flat surfaces have a larger area, heat may be exchanged better between the first and second heat dissipation members 310*a* and 310*b*.

The heat dissipation members 310*a* and 310*b* may form an air vent 319 by curved surfaces that are formed on the outer circumferential surfaces of the insertion cylinders.

Referring to FIG. 11, two curved surfaces 314*a* and 314*c* of the first heat dissipation member 310*a* may form the air vent 319 together with two curved surfaces 314*b* and 314*d* of the second heat dissipation member 310*b*.

The heat dissipation members 310*a* and 310*b* may be air-cooled by air that circulates through the through-holes 312 and the air vent 319. Meanwhile, the phase change materials 350 are inserted into the through-holes 312, but are not inserted into the air vent 319. Accordingly, the through-holes 312 may perform a temperature control function by virtue of the phase change materials 350, and the air vent 319 may perform an air-cooling function.

Figure 12:
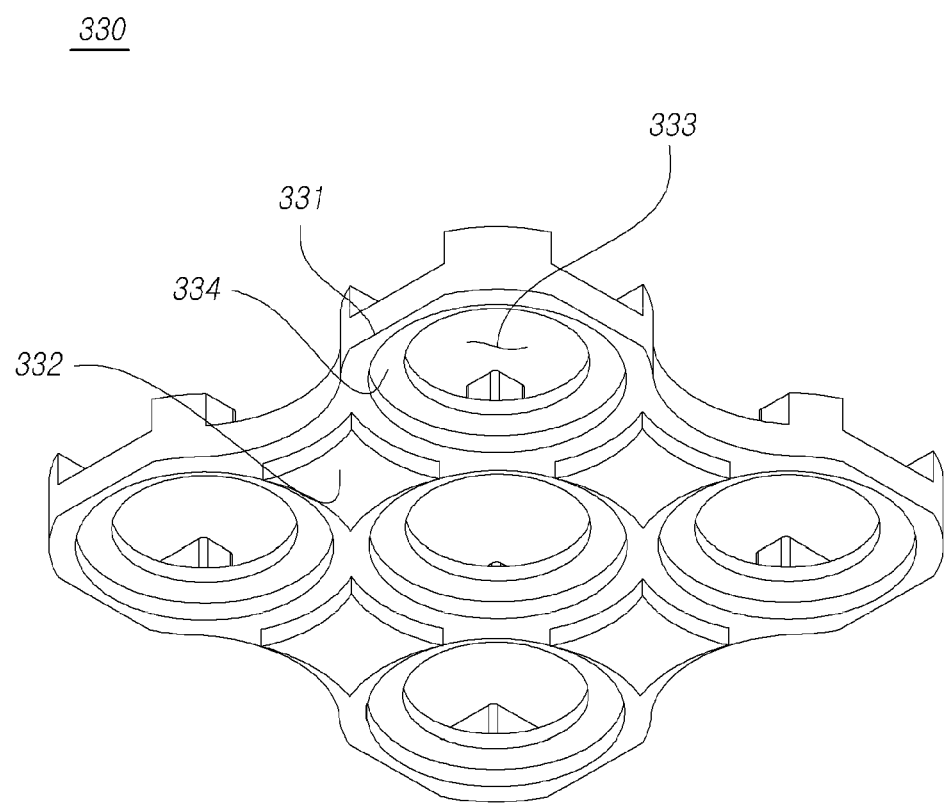
FIG. 12 is a bottom perspective view of a packing plate according to another embodiment.
Figure 13:
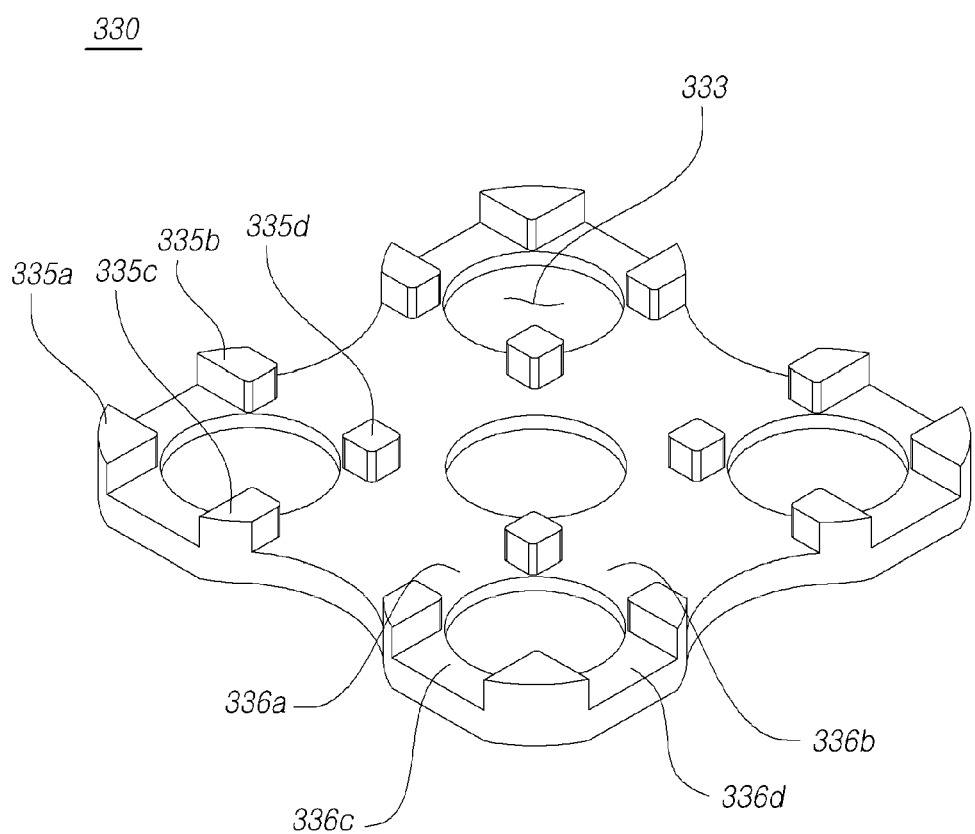
FIG. 13 is a top perspective view of the packing plate according to the embodiment illustrated in FIG. 12.

FIG. 12 is a bottom perspective view of the packing plate according to another embodiment, and FIG. 13 is a top perspective view of the packing plate according to the embodiment illustrated in FIG. 12.

The packing plates 330 are coupled to the upper and lower ends of the battery cells.

Referring to FIG. 12, the packing plate 330 may have battery mounting recesses 334 formed therein, and the battery cells may be mounted in the battery mounting recesses 334. The size of the cross-section of the battery mounting recesses 334 may be substantially the same as that of the battery cells, or may be larger than that of the battery cells by a coupling margin.

The packing plate 330 may have current flow holes 333 formed therein. When the battery cells are coupled to the packing plate 330, the electrodes of the battery cells may be exposed to the outside through the current flow holes 333. The electrodes of the battery cells, which are exposed to the outside, may be coupled with the connecting bar.

The shape of the outer circumferential surface 331 of the packing plate 330 may be substantially the same as that of the heat dissipation member. Accordingly, the packing plate 330 and the heat dissipation member may be coupled to each other with the same area.

Insertion protrusions 332 that are inserted into the through-holes may be formed on the bottom of the packing plate 330. When the phase change materials 350 are inserted into the through-holes, the insertion protrusions 332 may serve to prevent the movement of the phase change materials 350.

Referring to FIG. 13, a plurality of protrusions 335*a*, 335*b*, 335*c*, and 335*d* may be formed on the top of the packing plate 330 so as to be located around the current flow hole 333. The protrusions 335*a*, 335*b*, 335*c*, and 335*d* may be formed on the four corners around the current flow hole 333 so as to be spaced apart from each other.

Connecting-bar mounting recesses 336*a*, 336*b*, 336*c*, and 336*d*, where the connecting bar may be disposed, may be formed between the protrusions 335*a*, 335*b*, 335*c*, and 335*d*. The connecting bar may be disposed in the connecting-bar mounting recesses 336*a*, 336*b*, 336*c*, and 336*d*.

The connecting-bar mounting recesses 336*a*, 336*b*, 336*c*, and 336*d* may be formed between two current flow holes 333, and the connecting bar may connect the electrodes of the battery cells, which are exposed through the two current flow holes 333, by way of the connecting-bar mounting recesses 336*a*, 336*b*, 336*c*, and 336*d*.

Alternatively, the connecting bar may also connect the electrodes of the battery cells that are exposed through three current flow holes 330. In this case, the connecting bar may have the shape of 'T.'

Figure 14:
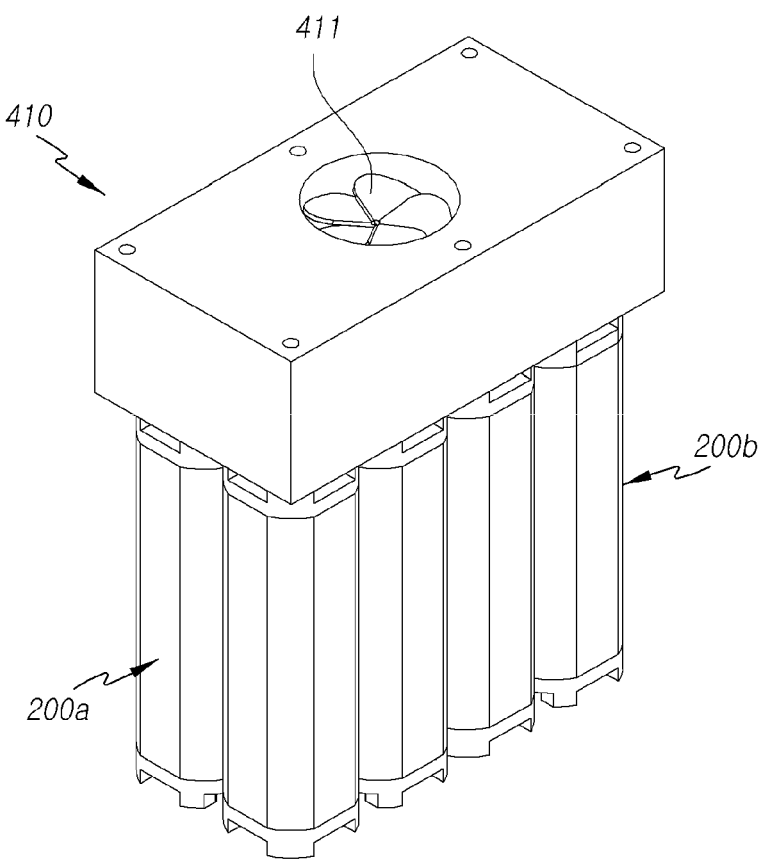
FIG. 14 is a view of an illustration of a battery pack to which the embodiments disclosed in this specification may be applied.
Figure 15:
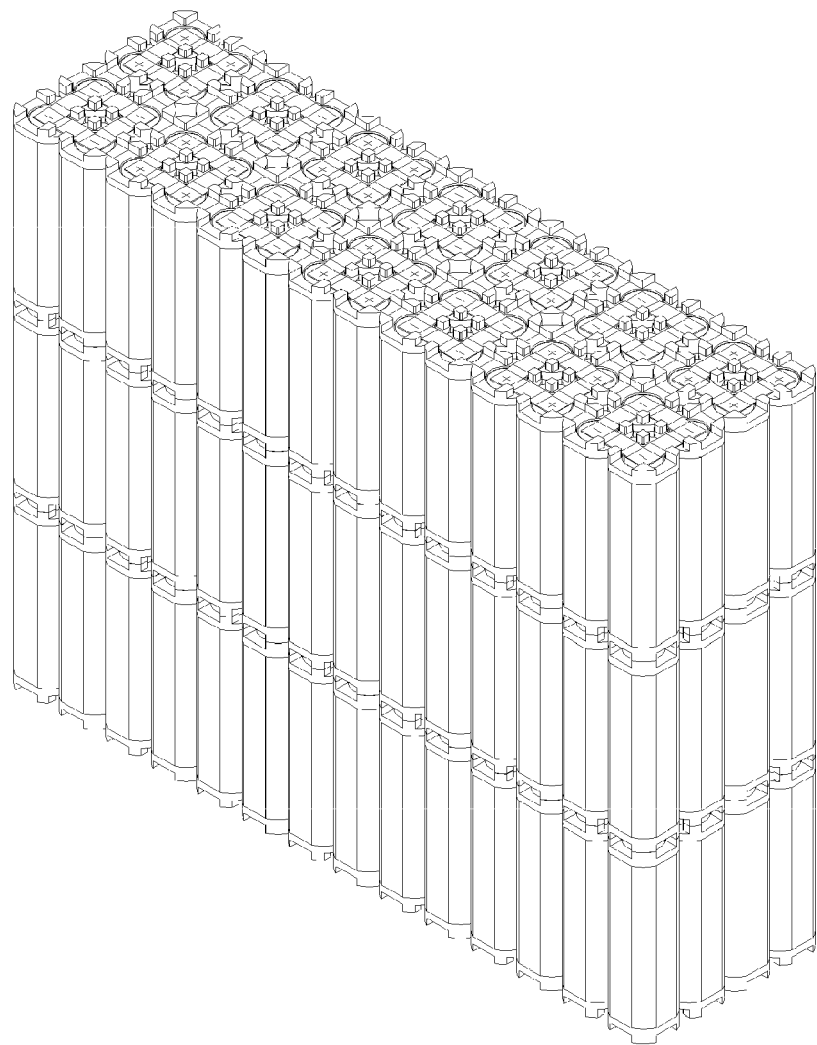
FIG. 15 is a view of an illustration of a structure in which a plurality of battery packing modules are coupled to each other.

FIG. 14 is a view of an illustration of a battery pack to which the embodiments disclosed in this specification may be applied, and FIG. 15 is a view of an illustration of a structure in which a plurality of battery packing modules are coupled to each other.

Referring to FIG. 14, the battery pack 400 may include a plurality of battery packing modules 200*a* and 200*b*. The battery pack 400 may include a cooling/heating device 410 that is coupled to sides of the plurality of battery packing modules and has a blower fan 411 and a heater therein.

The battery packing modules 200*a* and 200*b* may have a through-hole or air vent formed therein, and the cooling/heating device 410 may circulate air through the through-hole or air vent. Further, the cooling/heating device 410 may also inject heated air through the through-hole or air vent when necessary.

Referring to FIG. 15, the plurality of battery packing modules may be connected to each other in a single layer or in multiple layers.

The plurality of battery packing modules may include packing plates that have a plurality of protrusions formed around an air vent, and may be coupled to each other through the packing plates. Connecting bars may be disposed on the packing plates to electrically connect battery cells, and the plurality of battery packing modules may be electrically connected to each other through the connecting bars.

According to the embodiments of the present invention, it is possible to facilitate the expansion of a battery pack according to a required battery capacity and to minimize the volume and weight of the whole battery pack.

In addition, according to the embodiments of the present invention, a battery pack is integrally provided with a structure for cooling heat that is generated from battery cells when the battery pack is used, thereby maintaining the output of the battery at a constant level and extending the lifetime of the battery.

In addition, since terms, such as "including," "comprising," and "having" mean that one or more corresponding components may exist unless they are specifically described to the contrary, it shall be construed that one or more other components can be included. All the terms that are technical, scientific or otherwise agree with the meanings as understood by a person skilled in the art unless defined to the contrary. Common terms as found in dictionaries should be interpreted in the context of the related technical writings not too ideally or impractically unless the present invention expressly defines them so.

Although a preferred embodiment of the present invention has been described for illustrative purposes, those skilled in the art will appreciate that various modifications, additions and substitutions are possible, without departing from the scope and spirit of the invention as disclosed in the accompanying claims. Therefore, the embodiments disclosed in the present invention are intended to illustrate the scope of the technical idea of the present invention, and the scope of the present invention is not limited by the embodiment. The scope of the present invention shall be construed on the basis of the accompanying claims in such a manner that all of the technical ideas included within the scope equivalent to the claims belong to the present invention.

What is claimed is:

1. A battery packing module comprising:
a heat dissipation member having a plurality of insertion cylinders arranged in a lattice type and a through-hole formed between the insertion cylinders in a direction that is parallel to the longitudinal direction of the insertion cylinders, wherein the outer circumferential surfaces of adjacent insertion cylinders are connected to each other;
a plurality of cylindrical battery cells inserted into the insertion cylinders and configured to make contact with the inner circumferential surfaces of the insertion cylinders; and
packing plates coupled to the upper ends and lower ends of the battery cells, wherein the packing plates have a current flow hole formed therein through which electrodes of the battery cells are exposed and battery mounting recesses formed therein in which the battery cells are mounted,
wherein each of the packing plates has an insertion protrusion formed on one side thereof, which is inserted into the through-hole.

2. The battery packing module of claim 1, wherein a plurality of protrusions are formed around a current flow hole on an opposite side of the packing plates, and the battery packing module further comprises connecting bars disposed between the protrusions to connect the electrodes of the battery cells.

3. The battery packing module of claim 2, wherein the protrusions are formed on four corners around the current flow hole so as to be spaced apart from each other, and connecting-bar mounting recesses in which the connecting bars are disposed are formed between the protrusions.

4. The battery packing module of claim 2, wherein the connecting bars are formed of nickel or a nickel alloy and are coupled with the electrodes of the battery cells by welding.

5. The battery packing module of claim 1, wherein the insertion cylinders are manufactured by extruding magnesium or a magnesium alloy.

6. The battery packing module of claim 1, wherein two flat surfaces are formed on the outer circumferential surface of each insertion cylinder configured to make contact with flat surfaces of another battery packing module.

7. The battery packing module of claim 1, wherein a portion of at least one of the packing plates that corresponds to the through-hole is open.

8. The battery packing module of claim 1, wherein a phase change material (PCM) is inserted into the through-hole, and the portion of at least one of the packing plates that corresponds to the through-hole is blocked.

9. A battery packing module comprising:
a plurality of cylindrical battery cells, wherein four battery cells are arranged in a lattice, and one battery cell is disposed between the four battery cells;
a heat dissipation member having a plurality of insertion cylinders into which the battery cells are inserted, respectively, and a through-hole formed between the insertion cylinders, which are disposed at the outer periphery, in a direction that is parallel to the longitudinal direction of the insertion cylinders; and
packing plates coupled to the upper ends and lower ends of the battery cells, wherein the packing plates have a current flow hole formed therein through which electrodes of the battery cells are exposed and battery mounting recesses formed therein in which the battery cells are mounted,
wherein each of the packing plates has an insertion protrusion formed on one side thereof, which is inserted into the through-hole.

10. The battery packing module of claim 9, wherein a phase change material (PCM) is inserted into the through-hole.

11. The battery packing module of claim 9, further comprising:
connecting bars configured to connect the electrodes of the battery cells,
wherein each of the packing plates comprises a plurality of protrusions formed on the opposite side thereof and connecting-bar mounting recesses that are formed between the plurality of protrusions and in which the connecting bars are disposed.

12. The battery packing module of claim 9, wherein two flat surfaces are formed on the outer circumferential surface of an insertion cylinder disposed at the outer periphery configured to make contact with flat surfaces of another battery packing module.

13. The battery packing module of claim 12, wherein the through-hole is located inside a virtual plane that extends from the flat surface, and an air vent is formed near the through-hole when the battery packing module is coupled with the other battery packing module.

14. A battery pack comprising:
a plurality of battery packing modules; and
a cooling/heating device coupled to sides of the plurality of battery packing modules and having a blower fan and a heater therein,
wherein each of the battery packing modules comprises:
a heat dissipation member having a plurality of insertion cylinders arranged in a lattice type and a through-hole formed between the insertion cylinders in a direction that is parallel to the longitudinal direction of the insertion cylinders, wherein the outer circumferential surfaces of adjacent insertion cylinders are connected to each other;
a plurality of cylindrical battery cells inserted into the insertion cylinders and configured to make contact with the inner circumferential surfaces of the insertion cylinders; and
packing plates coupled to the upper ends and lower ends of the battery cells, wherein the packing plates have a current flow hole formed therein through which electrodes of the battery cells are exposed and battery mounting recesses formed therein in which the battery cells are mounted,
wherein each of the packing plates has an insertion protrusion formed on one side thereof, which is inserted into the through-hole.

15. The battery pack of claim 14, wherein the plurality of battery packing modules are connected to each other in a single layer or in multiple layers.

16. The battery pack of claim 15, wherein the battery packing module is connected with an adjacent battery packing module through connecting bars that are disposed between a plurality of protrusions that are formed around the current flow hole on an opposite side of at least one of the packing plates.

17. The battery pack of claim 14, wherein two flat surfaces are formed on the outer circumferential surface of each insertion cylinder of at least one of the battery packing modules that make contact with flat surfaces of an adjacent battery packing module when the battery packing module is coupled with the adjacent battery packing module.

18. The battery pack of claim 17, wherein a through-hole is formed between the insertion cylinder of the battery packing module and an insertion cylinder of the adjacent battery packing module.

19. The battery pack of claim 14, wherein the portion of the packing plate that corresponds to the through-hole is open.

\* \* \* \* \*